(12) United States Patent
Kung et al.

(10) Patent No.: US 10,753,591 B2
(45) Date of Patent: Aug. 25, 2020

(54) LIGHTNING PROTECTION STRUCTURE

(71) Applicant: INDUSTRIAL TECHNOLOGY RESEARCH INSTITUTE, Hsinchu (TW)

(72) Inventors: Hsiang-Cheng Kung, New Taipei (TW); Hsien-Lin Hu, Zhudong Township (TW); Hsin-Hwa Chen, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 341 days.

(21) Appl. No.: 15/857,226

(22) Filed: Dec. 28, 2017

(65) Prior Publication Data

US 2019/0170338 A1 Jun. 6, 2019

(30) Foreign Application Priority Data

Dec. 5, 2017 (TW) .............................. 106142527 A

(51) Int. Cl.
| | |
|---|---|
| *F21V 29/15* | (2015.01) |
| *F21V 15/01* | (2006.01) |
| *B64D 45/02* | (2006.01) |
| *H02G 13/00* | (2006.01) |

(52) U.S. Cl.
CPC .............. *F21V 29/15* (2015.01); *B64D 45/02* (2013.01); *F21V 15/01* (2013.01); *H02G 13/80* (2013.01)

(58) Field of Classification Search
CPC ......... F21V 15/01; F21V 29/15; B64D 45/02; H02G 13/80
USPC .......................................................... 361/218
See application file for complete search history.

(56) References Cited

U.S. PATENT DOCUMENTS

| | | | |
|---|---|---|---|
| 4,429,341 A | 1/1984 | King | |
| 4,796,153 A * | 1/1989 | Amason | B64D 45/02 244/1 A |
| 4,920,449 A * | 4/1990 | Covey | H05F 3/02 244/1 A |
| 2005/0041362 A1* | 2/2005 | Hall | B64D 45/02 361/225 |

(Continued)

FOREIGN PATENT DOCUMENTS

| | | |
|---|---|---|
| CN | 102751661 A | 10/2012 |
| CN | 202906201 U | 4/2013 |
| CN | 204190169 U | 3/2015 |

(Continued)

OTHER PUBLICATIONS

Machine translation of Gao et al. Chinese Patent Document CN 103552296 A, Feb. 5, 2014 (Year: 2014).*

(Continued)

*Primary Examiner* — Kevin J Comber
(74) *Attorney, Agent, or Firm* — Birch, Stewart, Kolasch & Birch, LLP

(57) ABSTRACT

A lightning protection structure is provided, which includes an insulation bottom layer, a graphite layer on the insulation bottom layer, an insulation shell on the graphite layer, and an electrically conductive component. A part of the electrically conductive component is disposed on the insulation shell, and another part of the electrically conductive component is in contact with the graphite layer.

9 Claims, 2 Drawing Sheets

(56) References Cited

U.S. PATENT DOCUMENTS

2010/0103582 A1    4/2010   Shimp et al.
2010/0224724 A1    9/2010   Kamino et al.

FOREIGN PATENT DOCUMENTS

| | | |
|---|---|---|
| CN | 104563693 A | 4/2015 |
| CN | 204691082 U | 10/2015 |
| CN | 103552296 B | 6/2016 |
| CN | 102458996 B | 11/2016 |
| EP | 2666807 B1 | 6/2017 |
| TW | M438747 U1 | 10/2012 |
| TW | I489597 B | 6/2015 |
| TW | M557900 U | 4/2018 |

OTHER PUBLICATIONS

Taiwanese Office Action and Search Report for Application No. 106142527, dated May 2, 2018.

\* cited by examiner

LIGHTNING PROTECTION STRUCTURE

CROSS REFERENCE TO RELATED APPLICATIONS

The present application is based on, and claims priority from, Taiwan Application Serial Number 106142527, filed on Dec. 5, 2017, the disclosure of which is hereby incorporated by reference herein in its entirety.

TECHNICAL FIELD

The technical field relates to a lightning protection structure, and the graphite layer of a lightning protection structure.

BACKGROUND

Precision instruments on aircraft can easily become damaged by lightning or the accumulation of an electrical charge during flight. A conventional conductive metal mesh can guide the current to a discharge structure or to ground to prevent the above problem. However, conductive metal mesh oxidizes and corrodes easily, which can negatively affect is conductivity and lifespan, incurring the additional cost of replacing the material. On the other hand, a plurality of metal meshes can be stacked to sustain the high current of the lightning. The stacked metal meshes not only increase the weight of the lightning protection structure, but they are also difficult to shape.

Accordingly, a novel lightning protection structure is called for. For example, a novel lightning protection structure should have excellent conductivity, fast heat dissipation, light weight, easy moldability (e.g. flexibility), and the like.

SUMMARY

One embodiment of the disclosure provides a lightning protection structure, including: an insulation bottom layer; a graphite layer on the insulation bottom layer; an insulation shell on the graphite layer; and an electrically conductive component, wherein a part of the electrically conductive component is disposed on the insulation shell, and another part of the electrically conductive component is in contact with the graphite layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
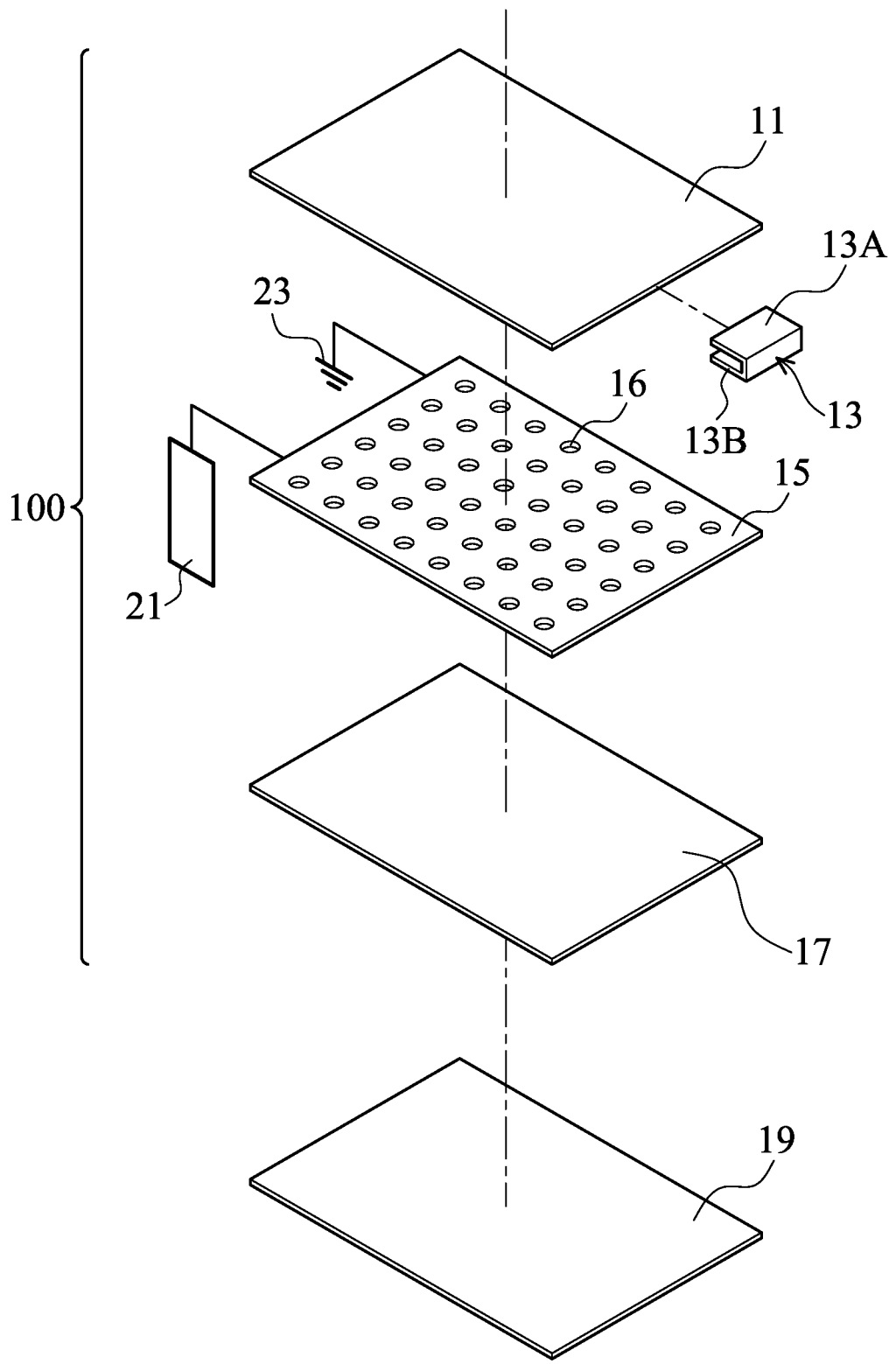
FIG. 1 shows a lightning protection structure in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
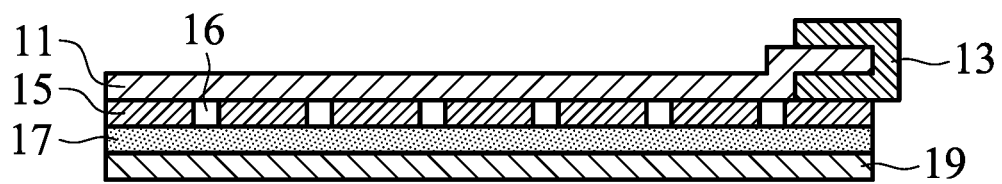
FIG. 2 shows a cross-sectional view of a part of the lightning protection structure in FIG. 1.

One embodiment of the disclosure provides a lightning protection structure 100 as shown FIGS. 1 and 2, and FIG. 2 is a cross-sectional view of a part of the lightning protection structure 100 in FIG. 1. The lightning protection structure 100 includes an insulation bottom layer 17. In one embodiment, the insulation bottom layer 17 has a thickness of about 10 micrometers to 30 cm. An overly thin insulation bottom layer 17 cannot prevent the object 19 (which should be protected by the lightning protection structure 100) from being damaged by the current penetrating through the insulation bottom layer when the current flows through the graphite layer (described below). If the insulation bottom layer 17 is too thick, this may increase the size and weight of the lightning protection structure 100. The insulation bottom layer 17 can be an insulation polymer material, such as epoxy resin, epoxy olefin polymer, or another suitable polymer material. In some embodiments, the polymer material can be blended with filler such as glass fiber, oxide particles, or the like to further improve the mechanical properties of the insulation bottom layer 17. For example, the polymer material and the filler may have a weight ratio from about 100:10 to 100:50. If there is not enough filler, then it cannot improve the mechanical properties of the insulation bottom layer 17. If there is too much filler, then it cannot be evenly mixed into the polymer material, and it will degrade the mechanical properties of the insulation bottom layer 17.

The lightning protection structure 100 includes a graphite layer 15 on the insulation bottom layer 17. In one embodiment, the graphite layer 15 has a thickness of 25 micrometers to 75 micrometers. A graphite layer 15 that is too thin cracks easily during molding or bending. A graphite layer 15 that is too thick may increase the size and weight of the lightning protection structure 100. In one embodiment, the graphite layer 15 has a heat transfer coefficient of 900 W/m·K to 1500 W/m·K. If the heat transfer coefficient of the graphite layer 15 is too low, then it cannot evenly dissipate the large amount of heat produced by a high current flow through the graphite layer 15. As a result, the local heat may damage the lightning protection structure 100. In one embodiment, the graphite layer 15 has an electrical conductivity of $4.5 \times 10^2$ S/m to $1.3 \times 10^4$ S/m. If the electrical conductivity of the graphite layer 15 is too low, some current may flow through the insulation bottom layer 17 and damage the object 19 that should be protected by the lightning protection structure 100. The graphite layer 15 can be manufactured according to Taiwan Patent No. 1598294.

In one embodiment, the graphite 15 may include one or more holes 16 to increase the flexibility of the graphite layer 15 and the lightning protection structure 100. For example, the holes 16 and the graphite layer 15 (including the holes 16 and the graphite part) have an area ratio of greater than 0:100 and less than or equal to 30:100. If the area of the holes 16 is too large, the thermal conductivity and the electrical conductivity of the graphite layer 15 will be too low. If there is no hole 16, then the flexibility of the graphite layer 15 cannot be increased any further. In one embodiment, the hole 16 may have a size of 0.5 mm to 3 cm. A hole 16 that is too small cannot increase the flexibility of the graphite layer 15. If the holes 16 are too large, the thermal conductivity and the electrical conductivity of the graphite layer 15 will be too low. Note that the shape, number, and distribution of the holes 16 as depicted in FIG. 1 are only for illustration. The shape of the holes 16 does not only have to be a circle, but it may also be a triangle, square, rectangle, hexagon, another polygon, or an irregular shape. The number of holes 16 can be more or fewer than what is depicted in the drawing (e.g. only one), and the holes 16 can be distributed randomly rather than being distributed regularly. One skilled in the art may form the holes 16 to have different shapes, sizes, numbers, and arrangements in the graphite layer 15 on the basis of design requirements and process tools.

In one embodiment, the surface of the graphite layer 15 is wrapped by a metal layer (not shown, e.g. silver, copper, iron, aluminum, another electrically conductive metal, or an alloy thereof) to help the current flow into the graphite layer 15. In one embodiment, the metal layer wrapping the graphite layer 15 has a thickness of about 10 nm to 1 micrometer. A metal layer that is too thin is equal to no metal layer. A metal layer that is too thick may block the holes 16 and reduce the flexibility of the graphite layer 15 and the lightning protection structure 100, which can degrade the thermally conductive effect of the graphite layer 15 (the thermal conductivity of the metal is lower than that of the graphite layer).

The lightning protection structure 100 includes an insulation shell on the graphite layer 15. In one embodiment, the insulation shell 11 is made of insulation material, e.g. similar to that of the insulation bottom layer 15 described above. For example, the insulation bottom layer 15 and the insulation shell 11 can be made of the same insulation material. Alternatively, the insulation bottom layer 15 and the insulation shell 11 can be made of different insulation materials. In one embodiment, the insulation shell 11 has a thickness of 10 mm to 100 cm. An insulation shell 11 that is too thin cannot efficiently protect the graphite layer 15 from climatic influences. An insulation layer 11 that is too thick may increase the size and weight of the lightning protection structure 100.

The lightning protection structure 100 includes an electrically conductive component 13. A first part 13A of the electrically conductive component 13 is disposed on the insulation shell 11, and a second part 13B of the electrically conductive component 13 is in contact with the graphite layer 15. For example, a metal sheet can be put on the edge of the insulation shell 11, and the metal sheet beyond the edge of the insulation shell 11 can be folded down to contact the graphite layer 15. Alternatively, a via hole (not shown) can be formed through the insulation shell 11, and the electrically conductive component 13 can be formed in the via hole. A part of the electrically conductive component 13 is disposed on the insulation shell 11, and another part of the electrically conductive component 13 is in contact with the graphite layer 15. As such, the current may flow to the graphite layer 15 through the electrically conductive component 13 when the lightning protection structure 100 is hit by lightning. In one embodiment, the electrically conductive component 13 can be metal such as silver, copper, iron, aluminum, another electrically conductive metal, or an alloy thereof.

In one embodiment, the lightning protection structure 100 may include an adhesive (not shown) between the insulation bottom layer 17 and the graphite layer 15, and between the insulation shell and the graphite layer 15. When the graphite 15 includes holes 16, the holes 16 can be partially or completely filled with the adhesive. Alternatively, the graphite layer 15 can be put on the insulation bottom layer 17, and both of them are then packaged by the insulation shell 11 to complete the lightning protection structure 100, and the adhesive can be optionally omitted.

Alternatively, the lightning protection structure 100 can be disposed on the surface of the object 19 to protect it from damage caused by charge accumulation or lightning. Note that the surface of the object 19 is planar in FIGS. 1 and 2, whereas in practice the surface of the object 19 can be curved, concave-convex, or otherwise irregularly shaped. However, the lightning protection structure 100 is flexible. As such, the lightning protection structure 100 can be conformally attached to the surface of the object 19. For example, the object 19 can be a building, a wind turbine, an aircraft such as an unmanned flying vehicle (UAV) or a common airplane, or another object that accumulates a charge easily (e.g. from the friction between the blades and the air) or that is particularly susceptible to being hit by lightning (e.g. the roof of a building, or the nose and wings of an airplane). The graphite layer 15 can be connected to a power storage device 21 (e.g. a capacitor), a discharge device 23 (e.g. ground or discharge device of the airplane wings), or both. The power storage device 23 may have a disconnect design, which may disconnect the circuit between the graphite layer 15 and the power storage device 23 to avoid overcharging. On the other hand, the power storage device 23 may connect to a battery or an electronic device in the object 19 to supply power to the electronic device or charge the battery. The discharge device 23 may discharge the electricity in the graphite layer 15 into ground or atmosphere, thereby preventing the graphite layer 15 from being damaged or losing effectiveness due to charge accumulation in the graphite layer 15.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1 (Preparation of Graphite Layer)

153.60 g of trimellitic anhydride (TMA), 24 g to 25 g of pyromellitic dianhydride (PMDA), 65 g of 3,3'4,4'-biphenyl tetracarboxylic dianhydride (BPDA), and 300.00 g of methylene diphenylene diisocyanate (MDI) were dissolved in 1637.00 g of N-Methyl-2-pyrrolidone (NMP) solvent and evenly stirred. The mixture was heated to 80° C. and reacted at 80° C. for 1 hour, then heated to 100° C. to 120° C. and reacted at 100° C. to 120° C. for 2 hours, and then heated to 150° C. to 200° C. and reacted at 150° C. to 200° C. for 2 hours. The completed reaction was cooled to room temperature to obtain a liquid (solid content of 25.00 wt %). The liquid was then coated onto glass, and then put into a hot-air oven to be dried at 80° C. for 1 hour, then dried at 150° C. for 1 hour, then dried at 200° C. for 1 hour, and then dried at 240° C. for 12 hours to obtain a film. The dried film was cooled to room temperature, and then dipped into water to release the film from the glass. The released film was put into the hot-air oven to be dried at 120° C. for 3 hours. Afterwards, the film was carbonized by the following steps. The film was treated from 25° C. to 1300° C. at a heating rate of less than 10° C./min under a protection atmosphere of 5% to 20% hydrogen and 80% to 95% nitrogen (or a combination of argon and helium), and then carbonized at 1300° C. under a pressure of 10 Kgf/cm$^2$ to 15 Kgf/cm$^2$ for at least 15 hours. Afterwards, the carbonized film was graphitized by the following steps. The carbonized film was treated from 1800° C. to 2800° C. at a heating rate of less than 10° C./min under a protection atmosphere of helium or argon with a purity of greater than 6N, and then graphitized at 2800° C. under a pressure of 15 Kgf/cm² to 25 Kgf/cm² for at least 8 hours to obtain a graphite layer. The properties of the graphite layer are shown in Table 1. The heat transfer coefficient of the graphite layer was measured by the Angstrom method, in which a sine wave of heat was applied to the graphite layer for observing the velocity and amplitude of the temperature wave along a plane direction of the graphite layer during a fixed time, thereby measuring the heat diffusion coefficient along the plane direction of the graphite layer. The thermal resistance of the graphite layer was measured according to the standard ASTM 5470, and the coefficient of thermal expansion (CTE) of the graphite layer was measured according to the standard ASTM E831-06.

Comparative Example 1

A commercially available copper sheet was provided, and the size and the properties of the copper sheet are shown in Table 1. The properties of the copper sheet were measured by methods that are similar to those in Preparation Example 1.

TABLE 1

|  | Density | Length (cm) | Width (cm) | thickness (cm) | Volume (cm³) | Heat transfer coefficient (W/m · K) | Weight (g) | Thermal resistance (K/W) | CTE (10⁻⁶/° C.) |
| --- | --- | --- | --- | --- | --- | --- | --- | --- | --- |
| Copper | 8.9 | 15 | 10 | 0.05 | 7.5 | 401 | 66.75 | 5.61 | 17.5 |
| Graphite layer of Example 1 | 2.1 | 15 | 10 | 0.05 | 7.5 | 1500 | 15.75 | 1.50 | 3.7 |

As shown in the comparison of Table 1, the graphite layer has the lower density, the higher heat transfer coefficient, the lower thermal resistance, and the lower CTE, which is more suitable for application in a lightning protection structure.

Example 1

The bottom surface of the graphite layer was adhered to a polymer layer by an epoxy adhesive, and the polymer layer served as an insulation bottom layer. Carbon fiber and non-conductive material were mixed to form an insulation layer. The top surface of the graphite layer was adhered to the insulation layer, and the insulation layer served as an insulation shell. A copper sheet was put on the edge of the surface of the insulation layer, and the copper sheet out beyond the edge of the surface of the insulation layer was folded down to contact the graphite layer. The folded copper sheet served as an electrically conductive component. The graphite layer was connected to ground by a copper wire to complete the lightning protection structure. The lightning protection structure was put onto a multimeter, and the multimeter was used to check whether there was a current flow through the insulation bottom layer. High voltage 1500V was applied to the conductive component for 2 seconds to simulate instant lightning. After the lightning test, the multimeter still worked normally. In addition, the readout on the multimeter during the lightning test was zero. This proves that the lightning protection structure could protect the object from a lightning strike.

Example 2

Example 2 was similar to Example 1, wherein the difference in Example 2 was the graphite layer being punched by a puncher to form a plurality of holes (with a diameter of about 1 micrometer) through the graphite layer. The lightning protection structure having the graphite with the holes could be bent, which had a higher flexibility. The lightning protection structure was put onto a multimeter. High voltage 1500V was then applied to the conductive component for 2 seconds to simulate instant lightning. After the lightning test, the multimeter still worked normally. This proves that the lightning protection structure (having the graphite with the holes) could protect the object from a lightning strike.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A lightning protection structure, comprising:
   an insulation bottom layer;
   a graphite layer on the insulation bottom layer;
   an insulation shell on the graphite layer; and
   an electrically conductive component, wherein a part of the electrically conductive component is disposed on the insulation shell, and another part of the electrically conductive component is in contact with the graphite layer,
   wherein the graphite layer is a continuous layer, and
   wherein the graphite layer includes a hole, and the hole is free of the electrically conductive component.

2. The lightning protection structure as claimed in claim 1, wherein the graphite layer has a heat transfer coefficient of 900 W/m·K to 1500 W/m·K.

3. The lightning protection structure as claimed in claim 1, wherein the graphite layer has an electrical conductivity if 4.5×10²S/m to 1.3×10⁴S/m.

4. The lightning protection structure as claimed in claim 1, wherein the graphite layer has a thickness of 25 micrometers to 75 micrometers.

5. The lightning protection structure as claimed in claim 1, wherein the hole and the graphite layer have an area ratio of greater than 0:100 and less than or equal to 30:100.

6. The lightning protection structure as claimed in claim 1, further comprising a metal layer wrapping the surface of the graphite layer.

7. The lightning protection structure as claimed in claim 1, further comprising adhesive between the insulation bottom layer and the graphite layer, and between the insulation shell and the graphite layer.

8. The lightning protection structure as claimed in claim 1, being conformally attached to an object, wherein the object is an aircraft, a building, or a wind turbine.

9. The lightning protection structure as claimed in claim 1, wherein the graphite layer is connected to a power storage device or a discharge device.

* * * * *